US006915490B1

(12) United States Patent
Ewing

(10) Patent No.: US 6,915,490 B1
(45) Date of Patent: Jul. 5, 2005

(54) METHOD FOR DRAGGING AND DROPPING BETWEEN MULTIPLE LAYERED WINDOWS

(75) Inventor: David Ewing, Long Mont, CO (US)

(73) Assignee: Apple Computer Inc., Cupertino, CA (US)

( * ) Notice: Subject to any disclaimer, the term of this patent is extended or adjusted under 35 U.S.C. 154(b) by 649 days.

(21) Appl. No.: 09/672,957

(22) Filed: Sep. 29, 2000

(51) Int. Cl.[7] .............................................. G06F 3/00
(52) U.S. Cl. ..................... 715/794; 715/767; 715/769; 715/790; 715/856
(58) Field of Search ............................... 715/764, 766, 715/767, 769, 781, 790, 791, 793, 794, 796, 797, 803, 856, 862; 345/764, 766, 767, 769, 781, 790, 791, 793, 794, 796, 797, 803, 856, 862

(56) References Cited

U.S. PATENT DOCUMENTS

| | | | | |
|---|---|---|---|---|
| 5,602,996 A | * | 2/1997 | Powers et al. | 345/807 |
| 5,877,763 A | * | 3/1999 | Berry et al. | 345/803 |
| 5,880,725 A | * | 3/1999 | Southgate | 345/790 |
| 6,025,841 A | * | 2/2000 | Finkelstein et al. | 345/803 |
| 6,072,488 A | * | 6/2000 | McFarland | 715/799 |
| 6,184,833 B1 | | 2/2001 | Bates et al. | 345/794 |
| 6,215,490 B1 | * | 4/2001 | Kaply | 345/788 |
| 6,590,594 B2 | * | 7/2003 | Bates et al. | 345/784 |
| 6,642,944 B2 | * | 11/2003 | Conrad et al. | 715/781 |

FOREIGN PATENT DOCUMENTS

| | | |
|---|---|---|
| EP | 0349459 A | 1/1990 |
| EP | 0514307 A | 11/1992 |
| GB | 2339128 A | 1/2000 |

OTHER PUBLICATIONS

Anon: "Interacting with the Interface," *Motif and CDE 2.1 Style Guide*, 'Online!, Oct. 1997, XP002218977, Austin, TX, U.S. Retrieved from the Internet:<URL:http://nscp.w-penn.edu/alx4.3html/moti, retrieved on Oct. 30, 2002, the whole document.

* cited by examiner

*Primary Examiner*—X. L. Bautista
(74) *Attorney, Agent, or Firm*—Burns Doane Swecker & Mathis, LLP

(57) ABSTRACT

Methods for manipulating a plurality of layered windows on a display are described. Specifically, the manipulation of layered windows includes moving a pointer to a visible portion of a partially hidden window and holding the pointer at the visible portion for a predetermined period of time. Responsive to the holding for a predetermined period of time, the partially hidden window is revealed. The manipulation of the layered windows can be used to drag and drop an icon from an active window to an inactive window. During the drag of an object, holding down a predetermined key on the keyboard can send the top-most-layered window to the back thereby disclosing other windows. If no drop occurs at the end of a drag operation, windows are returned to their original layers. However, if a drop occurs, the window in which the object is dropped becomes the topmost layer while other windows return to their original layers.

26 Claims, 9 Drawing Sheets

METHOD FOR DRAGGING AND DROPPING BETWEEN MULTIPLE LAYERED WINDOWS

BACKGROUND

The present invention relates generally to graphical user interfaces for computer systems. More particularly, the present invention relates to systems and methods for interfacing applications and operating systems which provide for flexible manipulation between multiple layered windows.

The evolution of the computer industry is unparalleled in its rate of growth m and complexity. Personal computers, for example, which began as little more than feeble calculators with limited memory, tape-driven input and monochrome displays are now able to tackle almost any data processing task. While this meteoric increase in power was almost sufficient to satisfy the demand of application programmers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

FIG. 1 illustrates an exemplary GUI display. The GUI display illustrated in FIG. 1 is based on a visual metaphor which uses a monitor screen as a work surface, called a "desktop". Icons 20, which can represent documents, applications, folders and system controls, can be presented on the desktop in relocatable regions termed "windows". FIG. 1 illustrates two windows; an active window 12 and an inactive window 14. The term active window refers to a window which is on the topmost layer of the desktop, while the term inactive window refers to a window which is not on the top-most layer of the desktop. The user interacts with the computer by, for example, moving icons 20, choosing commands, e.g., command 6, from menus, e.g., menu 2, on menu bars, e.g., menu bar 1, and manipulating window controls, for example, with the use of a cursor 10.

FIG. 2 illustrates a conventional method for moving icons from an active window to an inactive window. Initially, the cursor is placed over the icon to be moved (Step 201) and the icon is selected (Step 202). Next the cursor is placed over the menu bar (Step 203) and the desired menu is selected (Step 204). The cursor is placed over the menu item corresponding to a desired operation to be performed on the selected icon (Step 205) and the menu item is selected (Step 206).

Once the operation to be performed on the selected icons has been selected the destination for the icon is selected. Accordingly, the cursor is placed over a visible portion of a window (Step 207) and the window is selected (Step 208). Next the user determines whether the selected window is the destination window (Step 209). If the selected window is not the destination window ("No" path out of decision Step 209) the user continues to place the cursor over visible portions of windows (Step 207) and continues to select the windows (Step 208) until the destination window has been selected. When the user determines that the selected window is the destination window ("Yes" path out of decision Step 209), the cursor is placed over the menu bar (Step 210) and the desired menu is selected (Step 211). Next the cursor is placed over the menu item corresponding to the desired operation (Step 212) and the menu item is selected (Step 213). Accordingly, the desired operation, e.g., pasting of the icon in the destination window, is completed.

It will be appreciated that moving icons between layered windows in accordance with conventional methods requires a user to perform many steps. Moreover, the deeper the destination window is below the active window the more steps will be required of a user to select the destination window. Furthermore, operations which require many steps to be performed in a particular order can confuse a user. This confusion may result in the user forgetting the objective of the original operation, e.g., forgetting which icon is being moved.

SUMMARY

According to exemplary embodiments of the present invention, methods for manipulating a plurality of layered windows on a display include moving a pointer to a visible portion of a partially hidden window and holding the pointer at the visible portion for a predetermined period of time. Responsive to the holding for a predetermined period of time, the partially hidden window is revealed.

An advantage of the method according to the present invention involves the ability to drag an icon from an active window and before dropping the icon, to easily search for the desired destination window through multiple layered windows.

Moreover, according to exemplary embodiments of the present invention when the pointer is moved outside all windows, the windows are returned to their original display layers.

According to other exemplary embodiments of the present invention, during the drag of an icon, holding down a predetermined key on the keyboard can send the top-most-layered window to the back thereby disclosing other windows. If no drop occurs at the end of a drag operation, windows are returned to their original layers. However, if a drop occurs, the window in which the icon is dropped becomes the topmost layer while other windows return to their original layered order respectively.

BRIEF DESCRIPTION OF THE FIGURES

The objectives and advantages of the present invention will be understood by reading the following detailed description in conjunction with the drawings, in which.

DETAILED DESCRIPTION

In the following description, for purposes of explanation and not limitation, specific details are set forth, such as particular GUIs, techniques, etc. in order to provide a thorough understanding of the present invention. However, it will be apparent to one skilled in the art that the present invention may be practiced in any type of display system having a user interface that depart from these specific details. In other instances, detailed descriptions of well-known methods, GUIs, and operating systems are omitted so as not to obscure the description of the present invention.

Figure 3:
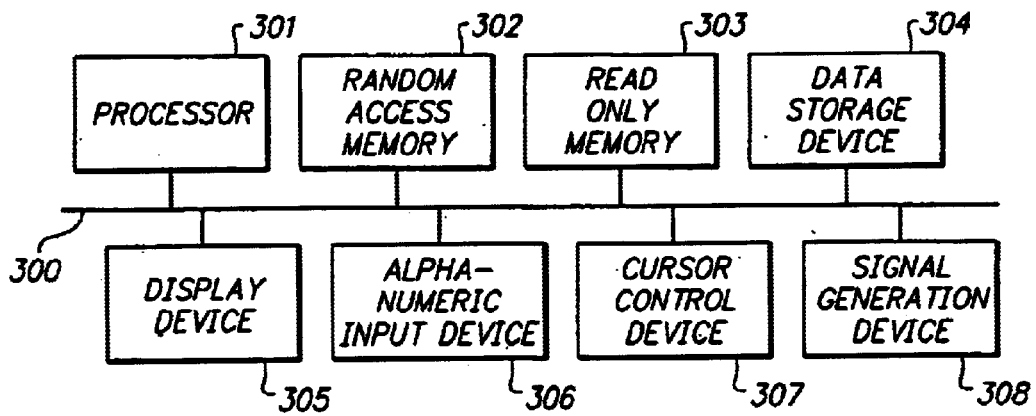
FIG. 3 depicts an exemplary computer system in block diagram in which the present invention can be implemented.

It will be readily appreciated by those skilled in the art that user interfaces and elements of user interfaces according to the present invention can be used in combination with any system having a processor and a display. In general, such computer systems, as illustrated in block diagram form by FIG. 3, comprise a bus 300 for communicating information, a processor 301 coupled with the bus for processing information and instructions, a random access memory 302 coupled with the bus 300 for storing information and instructions for the processor 301, a read only memory 303 coupled with the bus 300 for storing static information and instructions for the processor 301, a data storage device 304 such as a magnetic disk and disk drive or CD ROM drive coupled with the bus 300 for storing information and instructions, a display device 305 coupled to the bus 300 for displaying information to the computer user, an alphanumeric input device 306 including alphanumeric and function keys coupled to the bus 300 for communicating information and command selections to the processor 301, a cursor control device 307 coupled to the bus for communicating information and command selections to the processor 301, and a signal generating device 308 coupled to the bus 300 for communicating command selections to the processor 301.

The display device 305 utilized with the computer system and the present invention may be a liquid crystal device, cathode ray tube, or other display device suitable for creating images and/or alphanumeric characters (and/or ideographic character sets) recognizable to the user. The cursor control device 307 allows the computer user to dynamically signal the two dimensional movement of a visible symbol (cursor) on a display screen of the display device 305. Many implementations of the cursor control device are known in the art including a trackball, mouse, joystick or special keys on the alphanumeric input device 306 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation within the preferred embodiment, it is to be assumed that the input cursor directing device or push button may consist any of those described above and specifically is not limited to the mouse cursor device.

Figure 4:
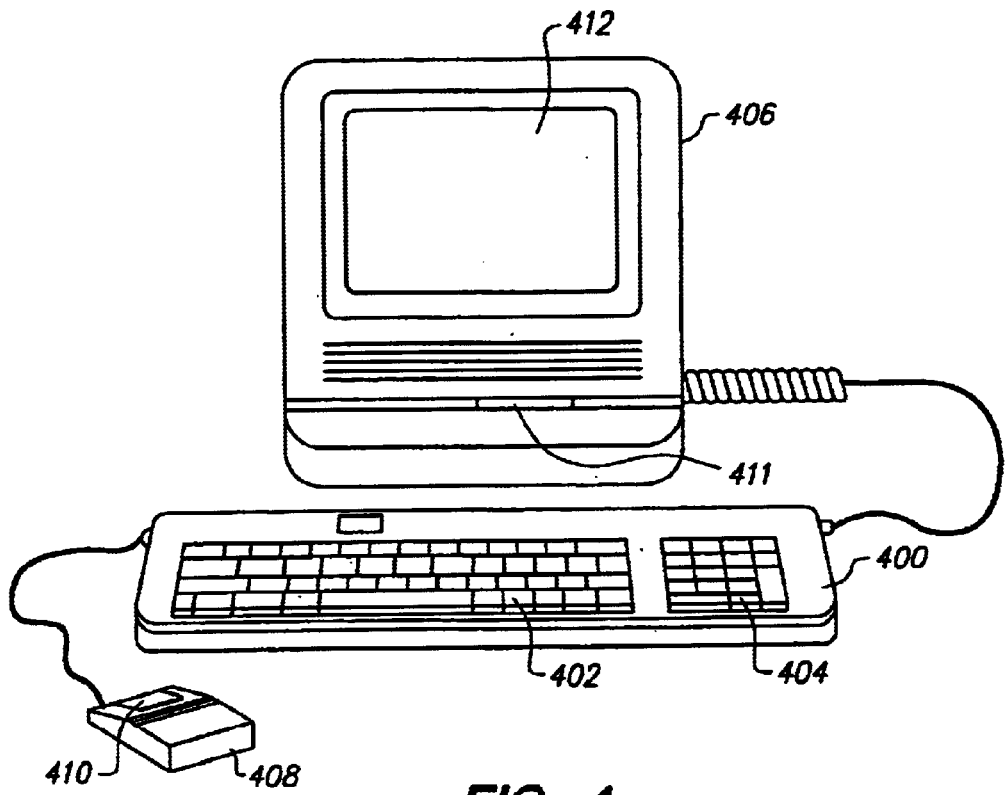
FIG. 4 illustrates an exemplary computer system in which the present invention can be implemented.

FIG. 4 illustrates an exemplary computer system in which the present invention can be implemented. It will be appreciated that this computer system is one of many computer systems that can include the present invention. Therein, a keyboard 400 with keys 402 and keypad 404 is attached to the computer 406 along with a mouse device 408 and mouse push button(s) 410 for controlling cursor. The mouse device and push button 410 make up a cursor control device 307. It will be appreciated that many other devices may be used as the cursor control device 307, for instance the keyboard 400 may be substituted for the mouse device 408 and button(s) 410 as just discussed above or, alternatively, a touch-sensitive screen or speech recognition device (not shown) may be used. The computer 406 also typically contains a one or more media drives 411 (e.g., floppy disk, hard disk or CD ROM) and a display screen 412.

Having described exemplary computer systems in which user interfaces according to the present invention can be implemented, the discussion now turns to a description of such user interfaces.

Figure 1:
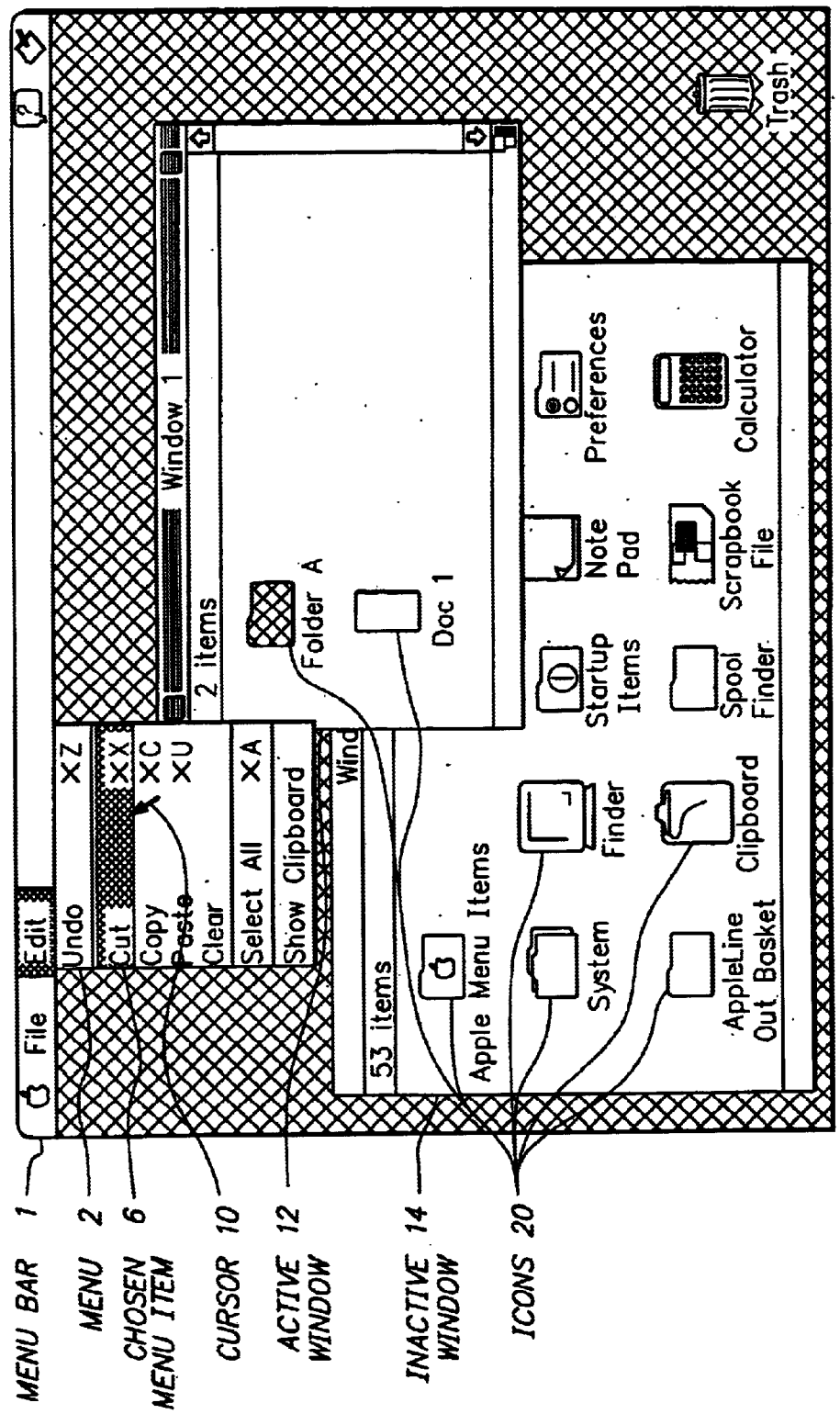
FIG. 1 depicts an exemplary desktop in which the present invention can be implemented.
Figure 2:
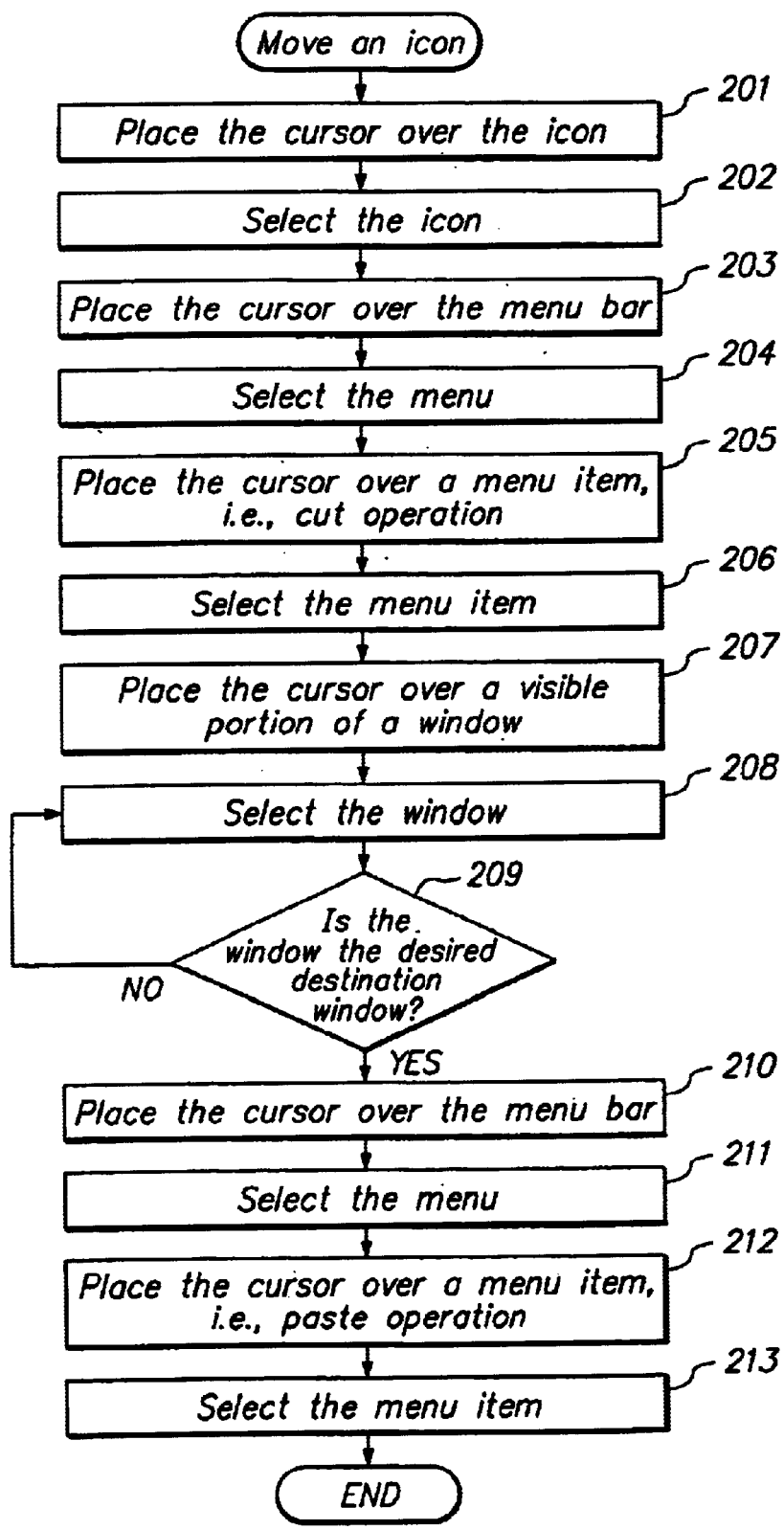
FIG. 2 illustrates a conventional method for moving an icon.
Figure 5:
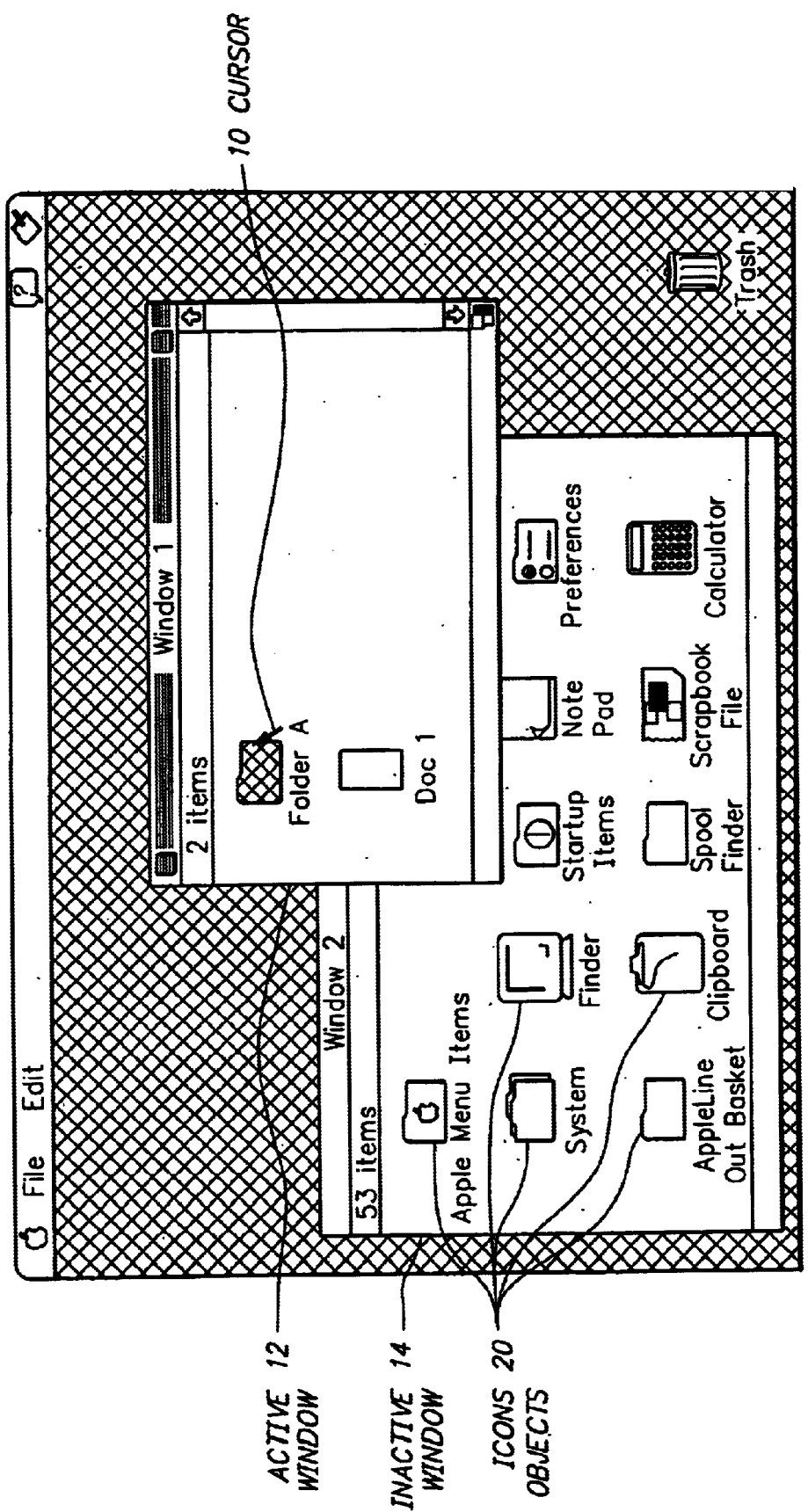
FIG. 5 illustrates the selection of an icon on a desktop.
Figure 6:
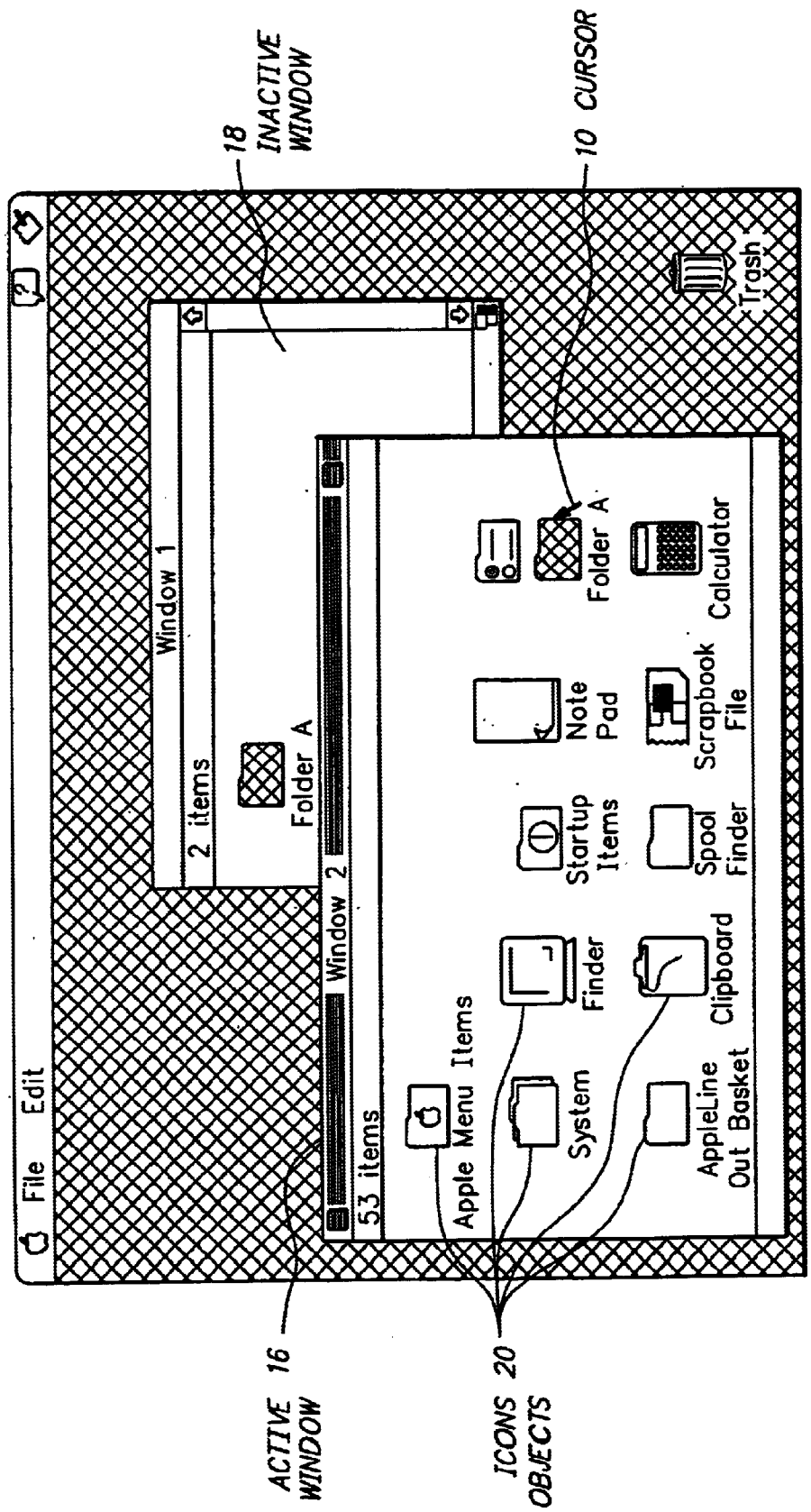
FIG. 6 illustrates the selection of an inactive window in accordance with an exemplary embodiment of the present invention.

FIGS. 5–8 illustrate the drag-and-drop operation in accordance with exemplary embodiments of the present invention. Therein, blocks performing similar functions as in FIG. 1 retain the same reference numerals. In FIG. 5, Window 1 is an active window 12 and Window 2 is an inactive window 14. If it is desired to move an icon 20, e.g., Folder A, from Window 1 to Window 2 the cursor 10 is placed over Folder A in Window 1 and Folder A is selected. The selection of Folder A is illustrated by the highlighted icon. As illustrated in FIG. 6 when Folder A is dragged to a visible portion of Window 2 and a predetermined amount of time has passed, Window 2 is brought to the top-most layer of the desktop and becomes the active window 16. Moreover, Window 1 becomes an inactive window 18. Those skilled in the art will appreciate that since the chosen item is not yet dropped, Folder A is still considered an item in Window 1. Thus, as illustrated in FIG. 6 the status bar of Window 1 indicates that Window 1 contains 2 items, including Folder A. If the user determines that Window 2 is the desired destination window, the user can release Folder A in Window 2.

Figure 7:
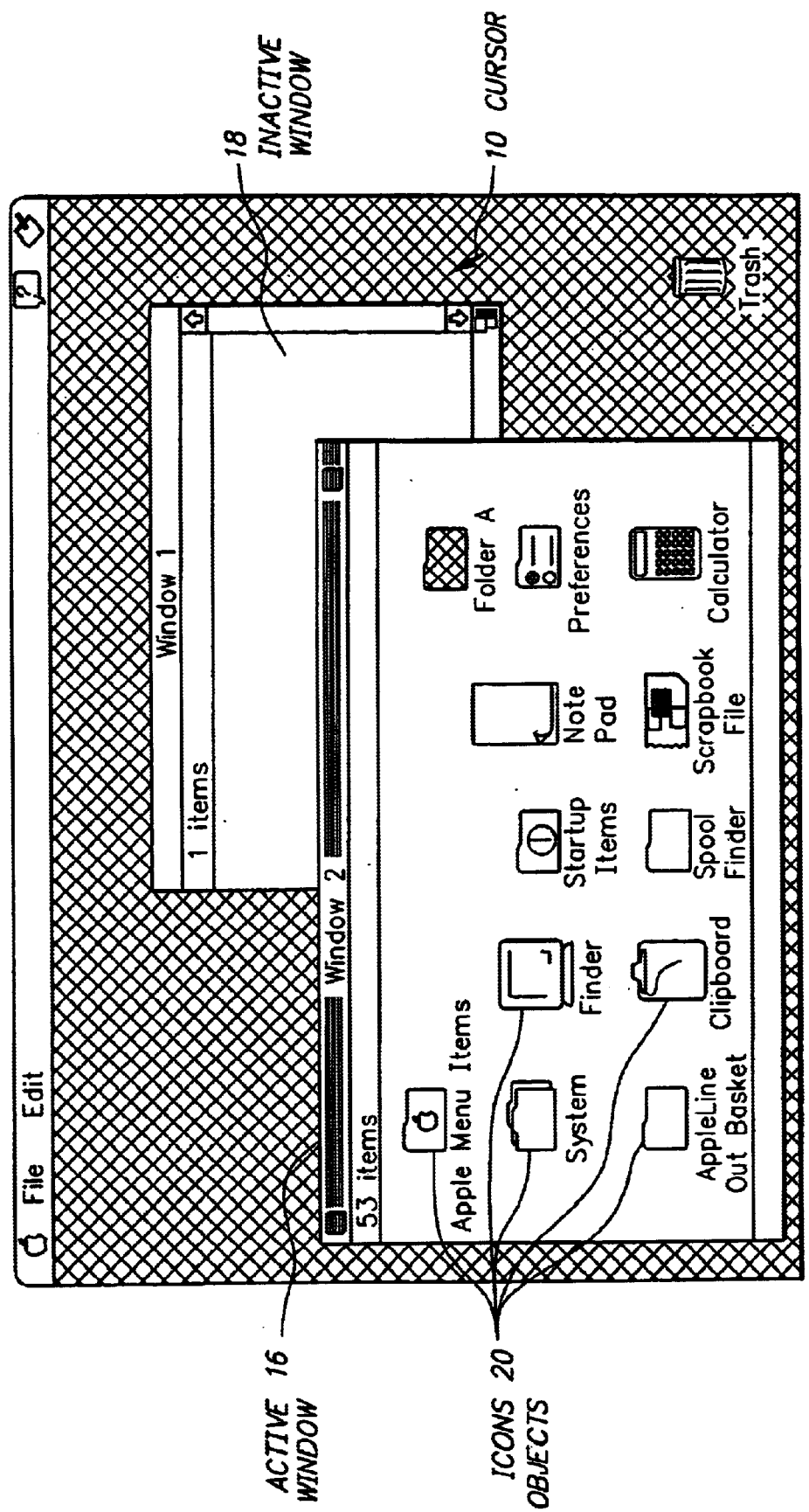
FIG. 7 illustrates the dropping of an icon in accordance with an exemplary embodiment of the present invention.

FIG. 7 illustrates the desktop after Folder A has been dropped onto Window 2. As illustrated in FIG. 7, once Folder A is dropped in Window 2, Window 2 remains at the top-most layer and Folder A is removed from Window 1. Further, Window 1 remains as an inactive window 18.

In accordance with exemplary embodiments of the present invention the manipulation of active and inactive windows can also be simplified by pressing a predetermined key on the keyboard. By pressing a predetermined key on the keyboard the active window becomes the bottom-most window of the tiled windows and an inactive window which is one layer below the active window becomes the active window. Referring again to FIG. 5, after selecting Folder A, the user can press a predetermined key on the keyboard and Window 1 would become the bottom-most window and Window 2 becomes the active window. Accordingly, Window 2 becomes fully exposed and the user can drop Folder A in any portion of the now active Window 2.

Figure 8:
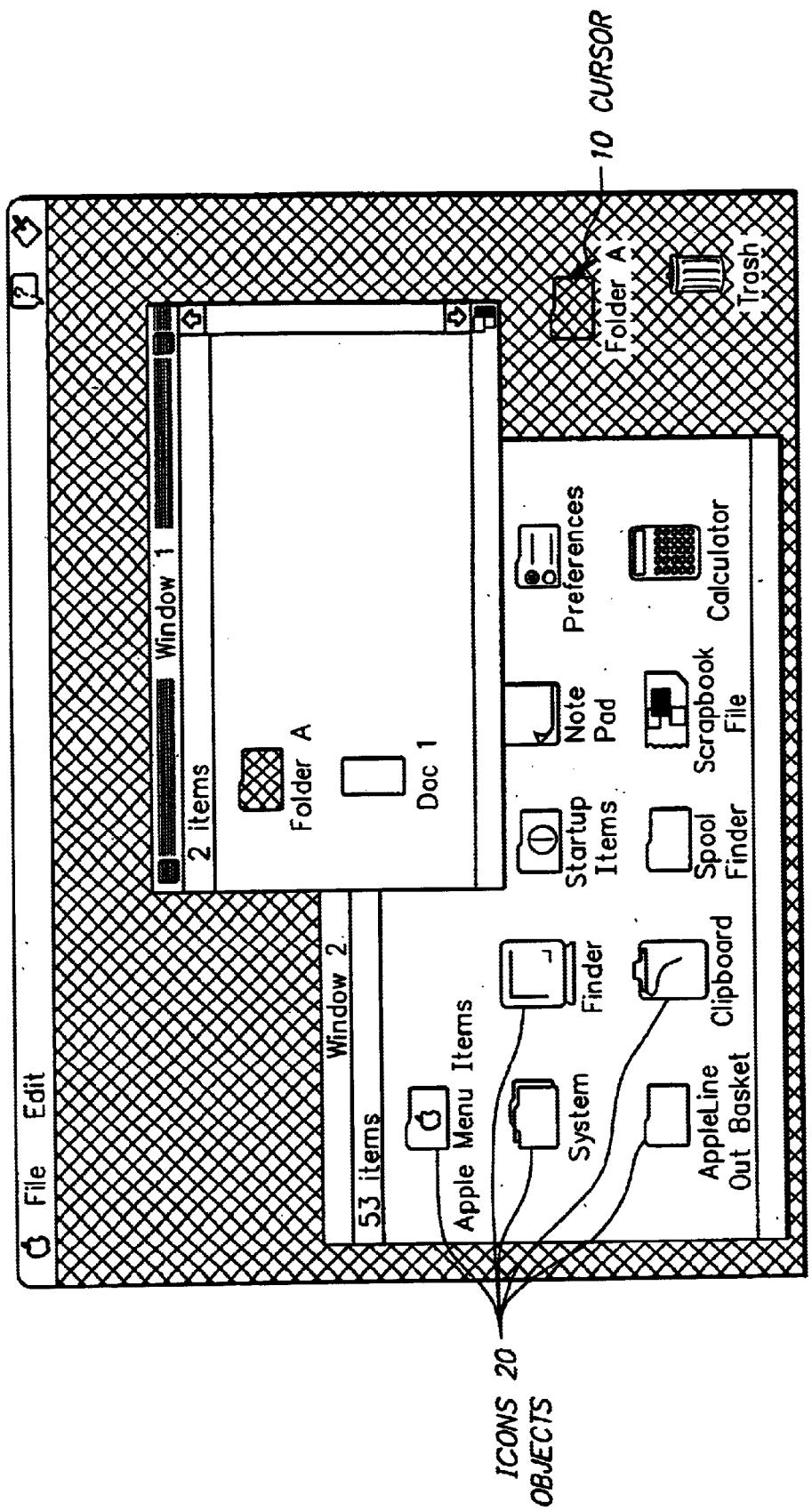
FIG. 8 illustrates the returning of windows to their original layered order in accordance with an exemplary embodiment of the present invention.

FIG. 8 illustrates another aspect of the present invention. In accordance with this aspect of the present invention when an icon is placed outside of all the windows, all windows are returned to their original layered order. Assume that Window 2 becomes an active window by placement of Folder A over Window 2 for a predetermined amount of time, as illustrated in FIG. 6. If it is desired for Window 1 to become an active window, Folder A can then be placed outside of all windows thereby making Window 1 the active window, as illustrated in FIG. 8.

Figure 9A:
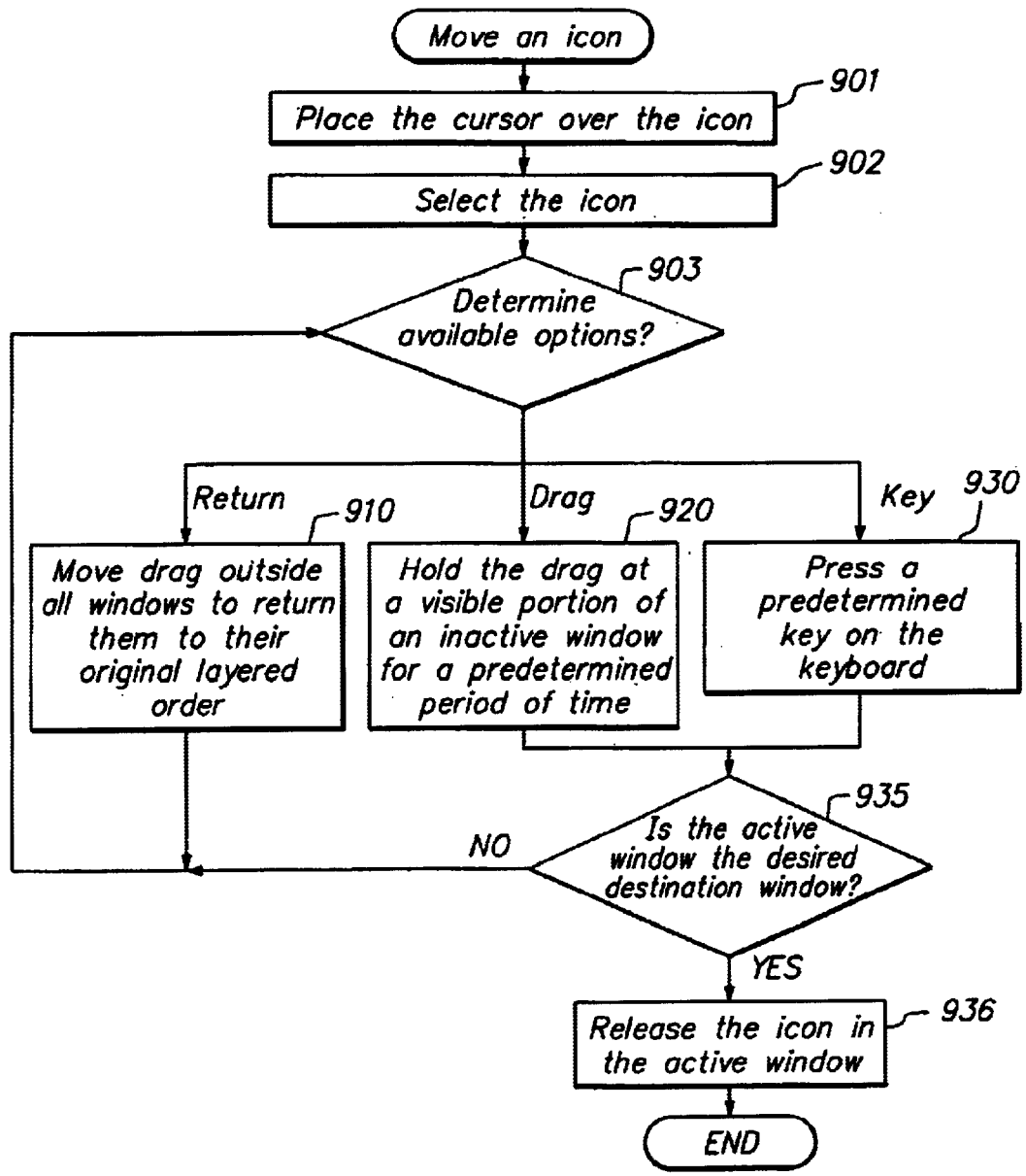
FIG. 9A illustrates a method for a user to move an icon in accordance with an exemplary embodiment of the present invention.

FIG. 9A illustrates a method for a user to move an icon in accordance with exemplary embodiments of the present invention. Initially, the cursor is placed over a desired icon (Step 901) and the icon is selected (Step 902). Once an icon is selected, it can be dragged to any portion of the desktop. The user can then determine the available operations to browse inactive windows. The user can use the mouse to drag the selected icon to a visible portion of an inactive window ("Drag" path out of decision step 903). By holding the drag at the visible portion after a predetermined amount of time, the inactive window becomes the active window and is brought to the top-most layer (Step 920). The user then can make an informative decision on whether the active window is the desired destination window (Step 935). If the active window is not the destination window ("No" path out of decision step 935) then the user can choose the next operation (Step 903). If, however, the user determines that the window is the destination window ("Yes" path out of decision step 935) the user can drop the icon in the window by releasing the selected icon to complete the move operation (Step 936).

Alternatively, the user can browse through inactive windows by pressing a predetermined key on the keyboard ("Key" path out of decision step 903). By pressing the predetermined key, the active window is sent back to the bottom-most layer thereby revealing the window on the second top-most-layer and making it the new active window (Step 930). The user then can decide whether the new active window is the desired destination window (Step 935). If the new active window is not the destination window ("No" path out of decision step 935) then the user can choose the next operation (Step 903). If, however, the user determines that the window is the destination window ("Yes" path out of decision step 935) the user can drop the icon in the window by releasing the selected icon to complete the move operation (Step 936).

Furthermore, the user can choose to view all windows in their original layered order by moving the drag outside all windows to assist the browsing of the inactive windows ("Return" path out of decision step 903 to step 910).

Figure 9B:
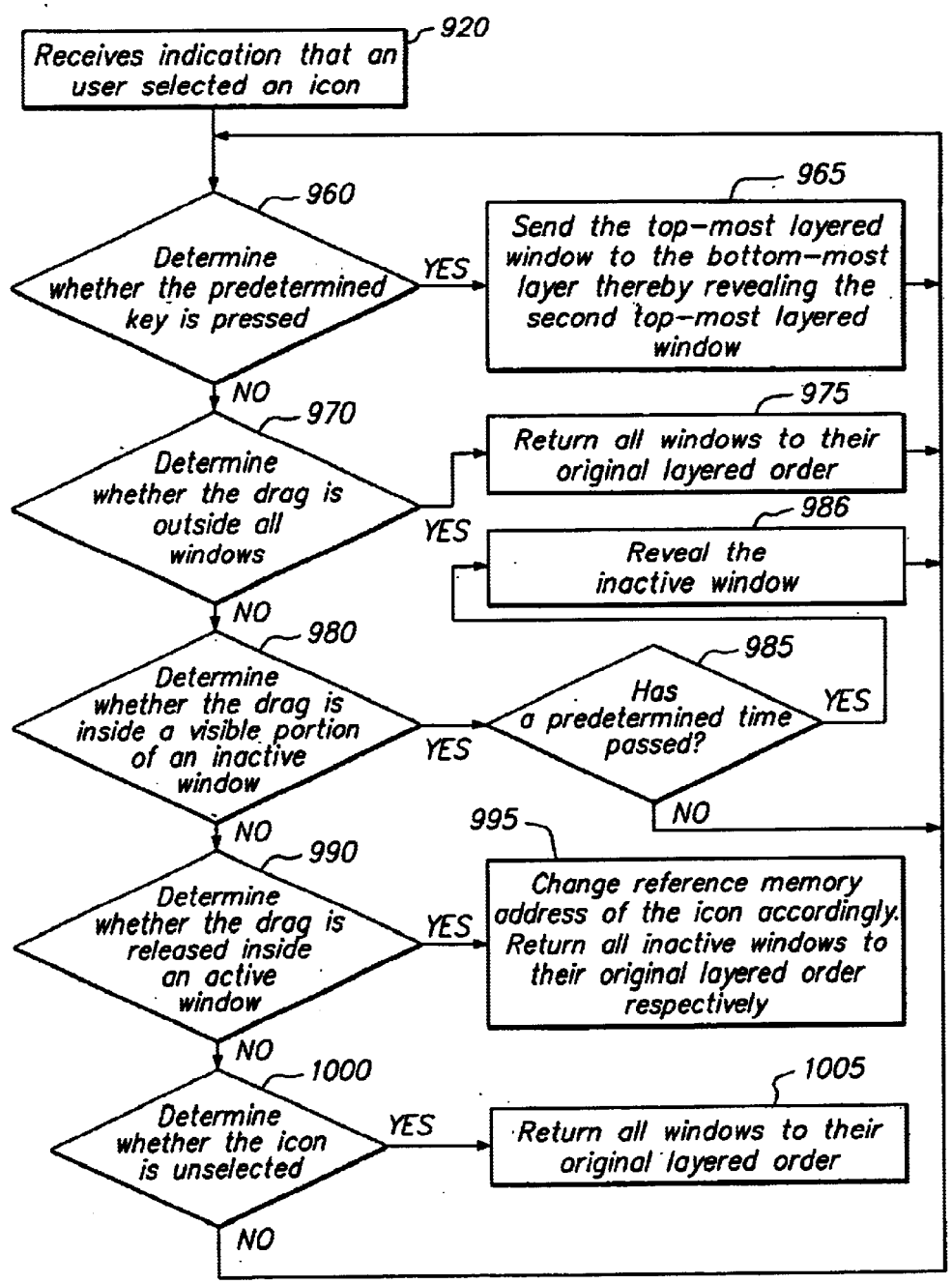
FIG. 9B illustrates a method for a computer to carry out a user's request to move an icon in accordance with an exemplary embodiment of the present invention.

FIG. 9B illustrates a method for a computer system in response to a user's input to move an icon in accordance with exemplary embodiments of the present invention. Initially, the computer system receives an indication that the user has selected an icon (Step 950). Next the system determines whether the predetermined key has been pressed (Step 960). If the system determines that the user has pressed the predetermined key ("Yes" path out of decision step 960), it then sends the top-most-layered window to the bottom-most layer and making the second top-most-layered window the new active window (Step 965). The system then determines the user's next input (Step 960).

If the system determines that the predetermined key has not been pressed ("No" path out of decision step 960), the system determines whether the icon has been dragged outside all windows (Step 970). If the system determines that the icon has been dragged outside all windows ("Yes" path out of decision step 970), the system then return all windows to their original layered order (Step 975) and determines the user's next input (Step 960). If the icon has not been dragged outside of all the windows ("No" path out of decision step 970), the system determines whether the icon has been dragged inside a visible portion of an inactive window (Step 980).

If the system finds that the icon has been dragged inside a visible portion of an inactive window ("Yes" path of decision step 980), the system then determines whether a predetermined period of time has passed (Step 985). If the icon has been held at the visible portion of the inactive window for a predetermined period of time ("Yes" path of decision step 985), the system then reveals the inactive window and makes it the active window (Step 986). The system then determines the user's next input (Step 960). If the icon has not been held for a predetermined period of time over the inactive window ("No" path of decision step 985), then the system determines the user's next input (Step 960).

If the system does not detect the icon being inside a visible portion of an inactive window ("No" path of decision step 980), the system then attempts to determine whether the icon is released inside the active window (Step 990). If it is determined that the icon has been released inside the active window ("Yes" path of decision step 990), the system changes the reference memory address of the selected icon to the active window accordingly and returns all inactive windows to their original layered order respectively (Step 995). However, if the system does not detect that the icon has been released inside an active window ("No" path of decision step 990), the system continues to determine whether the selected icon is unselected by the user (Step 1000). If the icon has been unselected by the user ("Yes" path of decision step 1000), the system return all windows to their original layered order (Step 1005). However, if the system determines that the icon remains to be selected ("No" path of decision step 1000), the system returns to the beginning to determine the user's next input (Step 960).

It will be recognized that the manipulation of an icon between an active window and an inactive window described above in connection with FIGS. 5–9 is substantially less complex than would be required using conventional methods.

Those skilled in the art will appreciate that, although the method depicted in FIG. 9B is in serial fashion, these steps can be performed in any order. Those skilled in art will also appreciate that, although only two windows are depicted in FIGS. 5–8 for clarity of the figure, methods for dragging and dropping implemented according to this exemplary embodiment of the present invention will typically involve large number of windows on various layers of the desktop. Moreover, depending upon the type of the icon is desired to be move, methods for dragging and dropping according to the present invention can be applied to and not limited to an application, a system folder or a document.

It should be noted that the present invention has been described in accordance with exemplary embodiments, which are intended to be illustrative in all aspects, rather than restrictive. Thus, the present invention is capable of many variations in detailed implementation, which may be derived from the description contained herein by a person or ordinary skill in the art. All such variations are considered to be within the scope and spirit of the present invention as defined by the following claims.

What is claimed is:

1. A method for manipulating a plurality of windows on a display, comprising the steps of:
    displaying a plurality of cascaded, open windows on a display to establish an original display layered order, wherein an active window is the window on a first display layer, windows on a display layer other than the first display layer are inactive windows and at least one of said inactive window is partially hidden;

receiving an indication of an icon being selected;

receiving an indication of the icon being dragged;

monitoring the current location of the icon;

starting a timer, if the icon is found being within a visible portion of first one of said inactive windows; and displaying said first inactive window on the first display layer, if the icon is found to be held within a visible portion of said first inactive window until said timer is expired.

2. A method of claim 1, further comprising the steps of:

receiving an indication of the icon being released onto said active window;

changing reference memory address of the icon respectively; and returning all inactive windows to the original display layered order respectively.

3. The method of claim 2, further comprising the steps of:

receiving an indication of a predetermined function key being pressed; and sending the window on the first display layer to the bottom-most layer.

4. The method of claim 2, further comprising the steps of:

returning all open windows to the original display layered order, if the icon is monitored to be outside of all open windows.

5. The method of claim 1, further comprising the steps of:

receiving an indication of a predetermined function key being pressed; and sending the window on the first display layer to the bottom-most layer.

6. The method of claim 1, further comprising the steps of:

returning all open windows to the original display layered order, if the icon is monitored to be outside of all open windows or upon receiving an indication of the icon being unselected.

7. A computer readable medium containing a program which executes the steps of:

receiving an indication of an icon being selected;

receiving an indication of the icon being dragged;

monitoring the current location of the icon;

starting a timer, if the icon is found being within a visible portion of first one of said inactive windows; and displaying said first inactive window on the first display layer, if the icon is found to be held within a visible portion of said first inactive window until said timer is expired.

8. The computer readable medium of claim 7, further executes the steps of:

receiving an indication of the icon being released onto said active window;

changing reference memory address of the icon respectively; and returning all inactive windows to the original display layered order respectively.

9. The computer readable medium of claim 8, further executes the steps of:

receiving an indication of a predetermined function key being pressed; and sending the window on the first display layer to the bottom-most layer.

10. The computer readable medium of claim 8, further executes the step of:

returning all open windows to the original display layered order, if the icon is monitored to be outside of all open windows.

11. The computer readable medium of claim 7, further executes the steps of:

receiving an indication of a predetermined function key being pressed; and sending the window on the first display layer to the bottom-most layer.

12. The computer readable medium of claim 7, further executes the step of:

returning all open windows to the original display layered order, if the icon is monitored to be outside of all open windows or upon receiving an indication of the icon being unselected.

13. A computer system comprising:

means for displaying a plurality of cascaded, open windows on a display to establish an original display layered order, wherein an active window is the window on a first display layer, windows on a display layer other than the first display layer are inactive windows and at least one of said inactive window is partially hidden;

means for receiving an indication of an icon being selected;

means for receiving an indication of the icon being dragged;

means for monitoring the current location of the icon;

means for starting a timer, if the icon is found being within a visible portion of first one of said inactive windows; and means for displaying said first inactive window on the first display layer, if the icon is found to be held within a visible portion of said first inactive window until said timer is expired.

14. The computer of claim 13, further comprising:

means for receiving an indication of the icon being released onto said active window;

means for changing reference memory address of the icon respectively; and means for returning all inactive windows to the original display layered order respectively.

15. The computer of claim 14, further comprising:

means for receiving an indication of a predetermined function key being pressed; and means for sending the window on the first display layer to the bottom-most layer.

16. The computer of claim 14, further comprising:

means for returning all open windows to the original display layered order, if the icon is monitored to be outside of all open windows.

17. The computer of claim 13, further comprising:

means for receiving an indication of a predetermined function key being pressed; and means for sending the window on the first display layer to the bottom-most layer.

18. The computer of claim 13, further comprising:

means for returning all open windows to the original display layered order, if the icon is monitored to be outside of all open windows or upon receiving an indication of the icon being unselected.

19. A computer system comprising:

a display device for displaying a plurality of cascaded, open windows on a display to establish an original display layered order, wherein an active window is the window on a first display layer, windows on a display layer other than the first display layer are inactive windows and at least one of said inactive window is partially hidden;

a cursor control device for receiving a request for selecting an icon and for moving the selected icon; and a processor for monitoring the current location of the icon, wherein the processor starts a timer if the icon is found being within a visible portion of first one of said inactive window and reveals said first inactive window on the first display layer, if the icon is found to be held within a visible portion of said first inactive window until said timer is expired.

20. The computer of claim 19, wherein said cursor control device further receives an indication of the icon being released onto said active window and in response, the processor changes reference memory address of the icon respectively and returns all inactive windows to the original display layered order respectively.

21. The computer of claim 20, further comprises a key input device for receiving an indication of a predetermined function key being pressed; and in response, the processor sends the window on the first display layer to the bottom-most layer.

22. The computer of claim 20, wherein said cursor control device further receives an indication which results in the icon being outside of all open windows; and in response, the processor returns all open windows to the original display layered order.

23. The computer of claim 19, further comprises a key input device for receiving an indication of a predetermined function key being pressed; and in response, the processor sends the window on the first display layer to the bottom-most layer.

24. The computer of claim 19, wherein said cursor control device further receives an indication which results in the icon being outside of all open windows or the cursor control device further receives an indication which results in the icon being unselected; and in response, the processor returns all open windows to the original display layered order.

25. A method for manipulating a first and second window on a display, comprising the steps of:

receiving an indication of a selected icon being dragged from the first window to the second window;

displaying said second window as an active window based on whether the icon is held within a visible portion of the second window for a predetermined amount of time.

26. A method of claim 25, wherein the first window is an active window and the second window is an inactive window when the indication is received.

* * * * *